United States Patent [19]
Brown et al.

[11] 3,786,848
[45] Jan. 22, 1974

[54] DEFLECTOR RING FOR TIRE

[75] Inventors: Wayne Brown, Aurora; Raymond W. Fabere; Gerald E. Grant, both of Oswego; Charles C. Sons, Peoria, all of Ill.

[73] Assignee: Caterpillar Tractor Co., Peoria, Ill.

[22] Filed: Apr. 24, 1972

[21] Appl. No.: 246,714

[52] U.S. Cl............................................ 152/209 R
[51] Int. Cl............................................. B60c 11/04
[58] Field of Search.................................. 152/209 R

[56] References Cited
UNITED STATES PATENTS
2,971,552  2/1961  Williams et al..................... 152/209

FOREIGN PATENTS OR APPLICATIONS
1,452,787  8/1966  France................................. 152/209

Primary Examiner—James B. Marbert
Attorney, Agent, or Firm—Paul S. Lempio

[57] ABSTRACT

A tire has an annular tread forming a plurality of circumferentially spaced tread bars thereon. A circumferentially continuous deflection ring is formed at the juncture of the tread with each tire sidewall to project beyond such sidewall to provide full protection thereat during tire operation.

10 Claims, 4 Drawing Figures

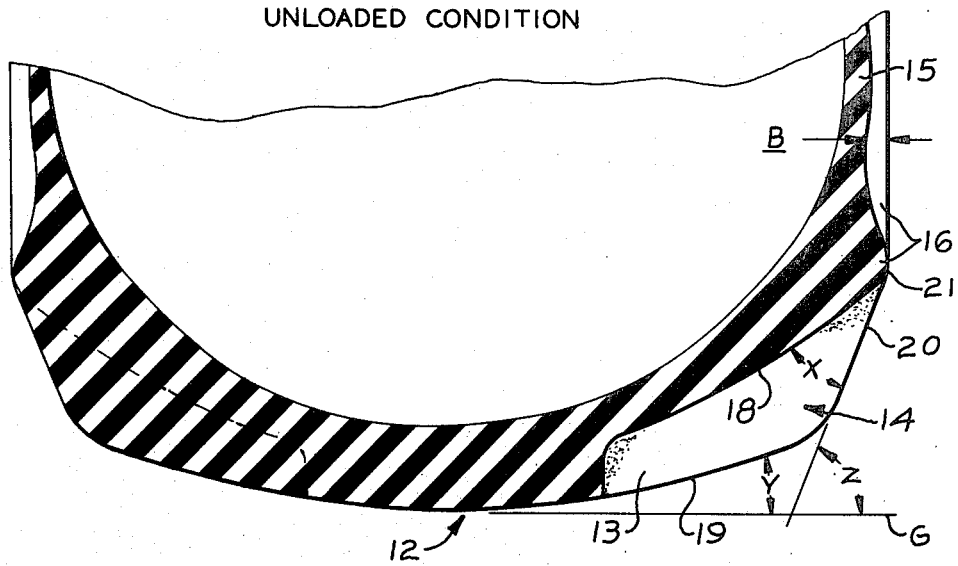
Fig. 3. UNLOADED CONDITION
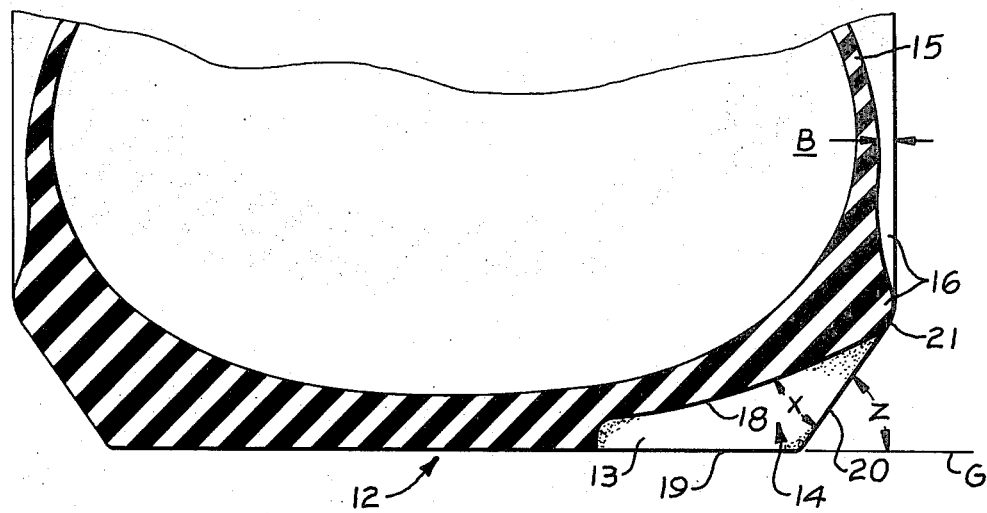
Fig. 4. LOADED CONDITION 3,786,848

DEFLECTOR RING FOR TIRE

BACKGROUND OF THE INVENTION

Tires employed on earthworking vehicles, such as wheel loaders, are subjected to severe underfoot conditions which tend to damage such tires. For example, when such tires are operated in a rock quarry there is a tendency for sharp rocks to puncture or otherwise severely damage the tire's sidewalls. Tire failures are quite costly since they result in excessive down-time and oftentimes require replacement of tires subjected to irreparable damage.

SUMMARY AND OBJECTS OF THIS INVENTION

An object of this invention is to overcome the above, briefly described problems by providing a tire which exhibits a high degree of resistance to damage, particularly cuts and abrasions, normally encountered in rock quarries and like job sites. The tire comprises an annular tread having a plurality of circumferentially spaced tread bars formed thereon and a circumferentially continuous deflection ring formed at the juncture of the tread with each tire sidewall to project outwardly beyond a respective sidewall.

BRIEF DESCRIPTION OF THE DRAWINGS

FIG. 3 is a sectional view of the tire, taken in the direction of arrows III—III in FIG. 1, showing the tire in an unloaded condition of operation; and FIG. 4 is a view similar to FIG. 3, but showing the tire in a loaded condition of operation.

DESCRIPTION OF THE PREFERRED EMBODIMENT

Figure 1:
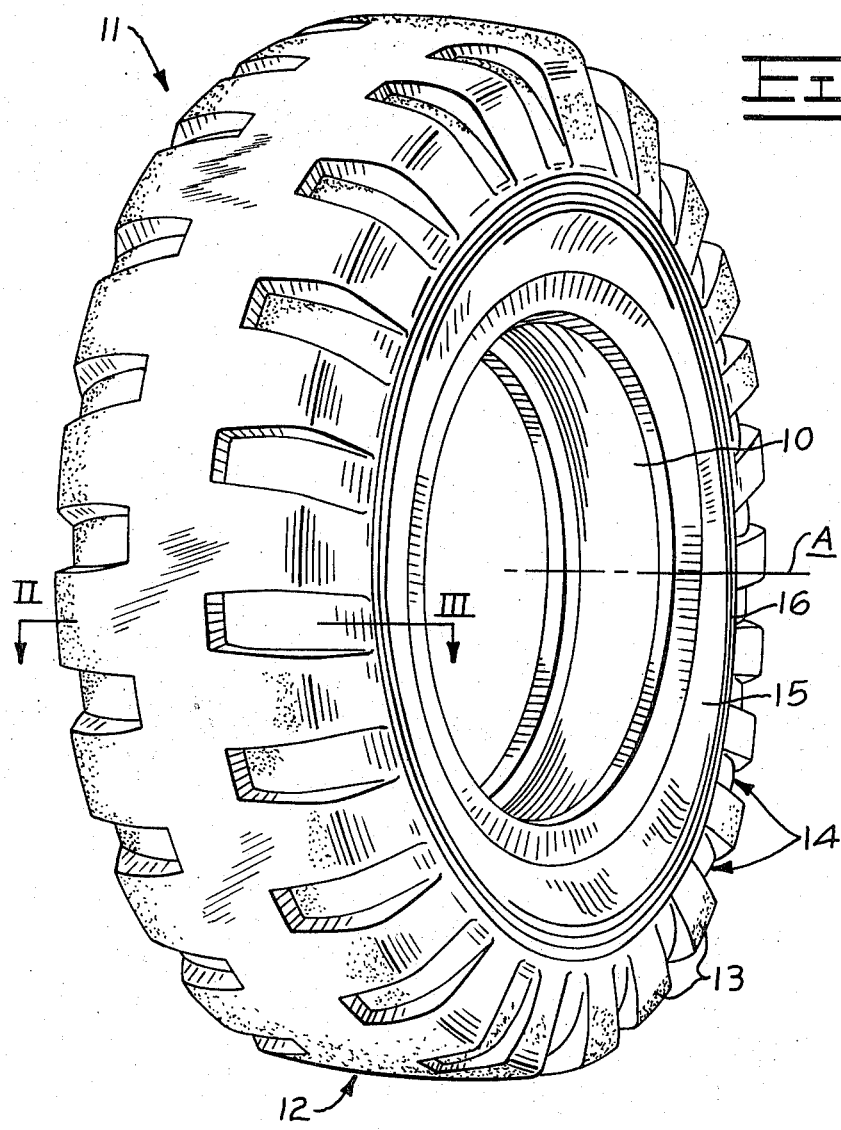
FIG. 1 is an isometric view of a tire embodying this invention.

FIG. 1 illustrates a standard rim 10 having a tire 11 of this invention suitably mounted thereon for rotation about a central axis A thereof. The tire comprises an annular tread 12 having a plurality of circumferentially spaced tread bars 13 formed thereon. The tread bars extend in the general direction of axis A to define a slot 14 between each pair of circumferentially adjacent tread bars.

An annular sidewall 15 extends radially inwardly from the tread towards axis A on each side of the tire and terminates at a suitable bead (not shown) mounted on rim 10. A circumferentially continuous deflector ring means 16 is formed at the juncture of each sidewall with the tread to project outwardly in the direction of the axis, beyond a respective sidewall. As shown in the FIGS. 3 and 4 unloaded and loaded conditions of tire operation, respectively, such deflector rings fully protect the sidewalls and are continuously spaced therefrom at a distance B.

Figure 2:
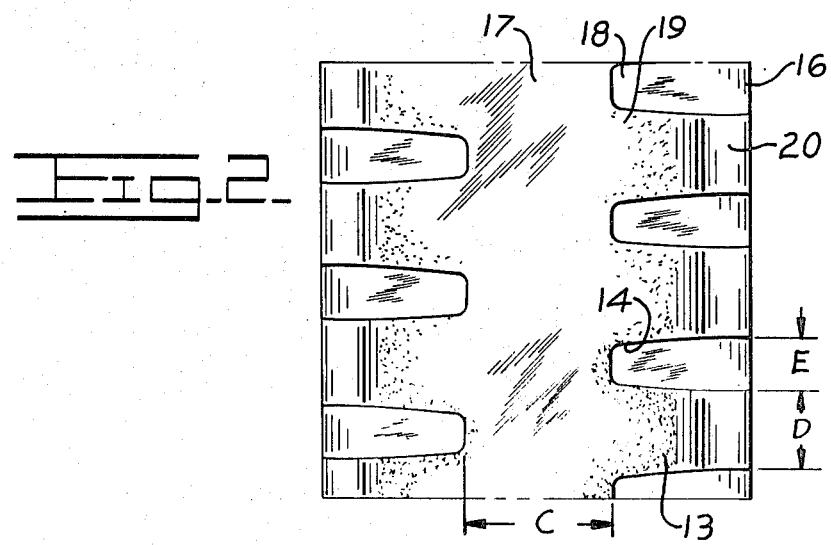
FIG. 2 is a top plan view of a portion of the tire's tread.

Referring to FIG. 2, a first series of tread bars 13, positioned adjacent to a respective sidewall, are staggered circumferentially with respect to a second series of tread bars positioned adjacent to the opposite sidewall. Each tread bar of one series is thus axially aligned with a respective slot 14 defined between each pair of circumferentially adjacent tread bars of the other series. A centrally disposed, substantially smooth and uninterrupted annular tread portion 17 is formed on the tread between the two series of tread bars.

The axial width C of such annular tread portion preferably approximates one third of the tire's width between deflector rings 16. A circumferentially continuous and uninterrupted ring of solid rubber is thus provided between the ground and the tire carcass during all phases of tire operation. For example, should any of the tread bars be torn off, a continuous ring of rubber will remain on the tire to permit the vehicle to continue to operate safely.

The circumferential length D of each tread bar is preferably one and one-half times a circumferential length E of a respective slot 14. The slots are preferably tapered to diverge axially outwardly away from central portion 17. Such configuration aids in the tire's self-cleaning function whereby mud and the like is automatically ejected from the slots during tire operation.

Referring to FIGS. 3 and 4, each slot is defined by a preferably slightly arcuate but yet generally flat bottom surface 18 extending between each pair of circumferentially spaced tread bars 13. Each tread bar comprises an outer top surface 19, preferably diverging axially outwardly relative to surface 18 to further aid in the self-cleaning function, and an axially outer side surface 20. Surfaces 18 and 20 at least approximately tangentially intersect an apex 21 of rounded deflector ring means 16.

As shown in the unloaded condition in FIG. 3, at least a substantial portion of surface 18 defines an acute angle X with surface 20, preferably approximating 35, which remains at least approximately constant when the tire tread is compressed to its FIG. 4 loaded condition. An acute angle Y defined between top surface 19 and an imaginary ground plane G changes from approximately 25° to zero degrees. During such transition, an acute angle Z defined between side surface 20 and the ground plane or level changes from approximately 70° to approximately 55°. The tire may be constructed to vary one or more of the angles illustrated in FIG. 3 plus or minus 10°, for example, so long as the herein described functional desiderata is achieved.

During tire operation and upon flexing thereof between its FIG. 3 and FIG. 4 positions, foreign matter at the footprint of the tire will be deflected axially away from the tire's sidewall to prevent damage thereto. Such deflecting function is accomplished due to the inherent cooperation afforded between the above-described deflector rings and tread bars. The tapered configuration of slots 14 also tend to expel foreign materials therefrom, rather than enveloping same. In addition, the integrated construction of the deflector ring, lugs and slots facilitates the employment of a thick tire cross section adjacent to the deflector rings to greatly increase the structural integrity thereat in comparison with certain conventional tires wherein corresponding deflector rings are interrupted circumferentially.

We claim:

1. A tire disposed for rotation about a central axis thereof comprising an annular tread, sidewalls extending radially inwardly from and on each side of said tread toward said axis, a plurality of axially disposed circumferentially spaced inwardly extending tread bars formed on said tread adjacent to a respective one of said sidewalls forming slots between each pair of adjacent bars, said slots being tapered to diverge axially outwardly towards its respective sidewall, said bars on one sidewall being staggered with respect to the bars on the other sidewall, whereby each bar is axially positioned opposite a slot, said bars terminating at an inward point thereby providing a generally smooth and uninterrupted centrally disposed annular surface, and a circumferentially continuous deflector ring means formed at the juncture of each sidewall with said tread to project outwardly in the direction of said axis, beyond a respective sidewall, to fully protect such sidewall when said tire is in both its unloaded and loaded conditions of operation.

2. The invention of claim 1 wherein the axial width of said annular tread portion approximates one-third of the axial width of said tire between said deflector ring means.

3. The invention of claim 1 wherein the circumferential length of each of said tread bars approximates one and one-half times the circumferential length of each of said slots.

4. The invention of claim 1 wherein a bottom surface defining a bottom of each slot, extending between each pair of circumferentially adjacent tread bars, at least approximately intersects an apex of a respective deflector ring means.

5. The invention of claim 4 wherein each of said tread bars comprises a radially outer top surface positioned radially outwardly from a bottom surface of a respective slot and an axially outer side surface intersecting said top surface and a respective deflector ring means.

6. The invention of claim 5 wherein said side surface at least approximately intersects the intersection of said bottom surface with the apex of said deflector ring means.

7. The invention of claim 5 wherein at least a substantial portion of said bottom surface forms an acute angle with said side surface which remains at least approximately constant upon deflection of said tire from an unloaded condition to a loaded condition.

8. The invention of claim 7 wherein said acute angle approximates 35°.

9. The invention of claim 7 wherein an acute angle defined between an imaginary ground plane, parallel to said axis, and said top surface approximates 25° in said unloaded condition and zero degrees in said loaded condition.

10. The invention of claim 9 wherein an acute angle defined between said imaginary ground plane and said side surface approximates 70° in said unloaded condition and 55° in said loaded condition.

* * * * *